United States Patent
Zhang et al.

(10) Patent No.: US 10,399,889 B2
(45) Date of Patent: Sep. 3, 2019

(54) HIGH-PERFORMANCE GLASS FIBER COMPOSITION, GLASS FIBER THEREOF, AND COMPOSITE MATERIAL

(71) Applicant: JUSHI GROUP CO., LTD., Tongxiang (CN)

(72) Inventors: Lin Zhang, Tongxiang (CN); Guorong Cao, Tongxiang (CN); Wenzhong Xing, Tongxiang (CN); Guijiang Gu, Tongxiang (CN); Xiucheng Hong, Tongxiang (CN)

(73) Assignee: JUSHI GROUP CO., LTD., Tongxiang, Jhejiang (CN)

( * ) Notice: Subject to any disclaimer, the term of this patent is extended or adjusted under 35 U.S.C. 154(b) by 0 days.

(21) Appl. No.: 15/565,412

(22) PCT Filed: Apr. 6, 2016

(86) PCT No.: PCT/CN2016/078518
§ 371 (c)(1),
(2) Date: Oct. 9, 2017

(87) PCT Pub. No.: WO2016/169408
PCT Pub. Date: Oct. 27, 2016

(65) Prior Publication Data
US 2018/0118608 A1    May 3, 2018

(30) Foreign Application Priority Data
Apr. 21, 2015   (CN) .......................... 2015 1 0191134

(51) Int. Cl.
*C03C 3/087*   (2006.01)
(52) U.S. Cl.
CPC .......... *C03C 3/087* (2013.01); *C03C 2213/00* (2013.01)
(58) Field of Classification Search
CPC .......... C03C 3/087; C03C 13/00; C03C 13/06
See application file for complete search history.

(56) References Cited

U.S. PATENT DOCUMENTS

| | | | |
|---|---|---|---|
| 8,912,107 B2 * | 12/2014 | Zhang | C03C 13/00 501/35 |
| 9,758,423 B2 * | 9/2017 | Cao | C03C 3/087 |
| 2007/0105701 A1 * | 5/2007 | Hoffmann | C03C 13/00 501/36 |
| 2008/0009403 A1 * | 1/2008 | Hofmann | C03C 13/00 501/55 |
| 2009/0286440 A1 * | 11/2009 | Lecomte | C03C 3/087 442/181 |
| 2012/0135849 A1 | 5/2012 | Hoffman et al. | |
| 2013/0244858 A1 * | 9/2013 | Li | C03C 3/087 501/35 |
| 2017/0283309 A1 * | 10/2017 | Cao | C03C 3/087 |
| 2018/0230039 A1 * | 8/2018 | Cao | C03C 3/087 |

FOREIGN PATENT DOCUMENTS

| | | |
|---|---|---|
| CN | 101580344 A | 11/2009 |
| CN | 101838110 A | 9/2010 |
| CN | 105016622 A | 11/2015 |
| EP | 3093276 A2 | 11/2016 |
| WO | 2016040425 A1 | 3/2016 |

OTHER PUBLICATIONS

From PCT/CN2016/078518, International Search Report, dated Jul. 11, 2016, with English translation from WIPO.
From PCT/CN2016/078518, International Preliminary Report on Patentability, dated Jul. 11, 2016, with English translation from WIPO.
From PCT/CN2016/078518, Written Opinion of the International Searching Authority, dated Jul. 11, 2016, with English translation from WIPO.

* cited by examiner

*Primary Examiner* — Elizabeth A. Bolden
(74) *Attorney, Agent, or Firm* — Ladas & Parry, LLP

(57) ABSTRACT

The present invention provides a glass fiber composition, glass fiber and composite material therefrom. The glass fiber composition comprises the following components expressed as percentage by weight: 58.5-62.5% $SiO_2$, 14.5-17% $Al_2O_3$, 10.5-14.5% CaO, 8-10% MgO, 0.5%<$Li_2O$≤1%, 0.05-1% $Na_2O$, 0.05-1% $K_2O$, 0.05-1% $Fe_2O_3$, 0.15-1.5% $TiO_2$, wherein the range of the molar percentage ratio C1=$Li_2O/Al_2O_3$ is 0.105-0.22, and the range of the molar percentage ratio C2=MgO/(CaO+MgO) is 0.435-0.55. Said composition can increase the mechanical properties of the glass while reducing the glass viscosity, crystallization risk and amount of bubbles, thereby making it more suitable for large-scale production with refractory-lined furnaces.

19 Claims, No Drawings

HIGH-PERFORMANCE GLASS FIBER COMPOSITION, GLASS FIBER THEREOF, AND COMPOSITE MATERIAL

CROSS REFERENCE TO RELATED APPLICATIONS

This application is the U.S. National Phase of PCT Application No. PCT/CN2016/078518 filed on Apr. 6, 2016, which claims the priority to Chinese Application 201510191134.0, filed Apr. 21, 2015 and titled "A High-Performance Glass Fiber Composition, Glass Fiber and Composite Material Therefrom", the disclosures of which are incorporated herein by reference in their entireties.

FIELD OF THE INVENTION

The present invention relates to a high-performance glass fiber composition, specifically to a high-performance glass fiber composition that can be used as a reinforcing base material for advanced composites, and to a glass fiber and composite material therefrom.

BACKGROUND OF THE INVENTION

Glass fiber is an inorganic fiber material and can be used to reinforce resins to produce composite materials with good performance. As a reinforcing base material for advanced composite materials, high-performance glass fibers were originally used mainly in the national defense industry, such as aeronautic, aerospace and military industry. With the progress of science and technology and the development of economy, high-performance glass fibers have been widely used in civil and industrial fields such as motors, wind blades, pressure vessels, offshore oil pipes, sports apparatus and auto industry.

Since the American company Owens Corning ("OC") developed S-2 glass fiber, different countries have developed high-performance glass fibers with various compositions, e.g. R glass fiber developed by French company Saint-Gobain, HiPer-tex glass fiber by American company OC and high-strength glass fiber #2 by Nanjing Fiberglass Research & Design Institute, China. The original high-performance glass compositions were based on an $MgO$—$Al_2O_3$—$SiO_2$ system and a typical solution was S-2 glass of American company OC. However, the production of S-2 glass is excessively difficult, as its forming temperature is up to about 1571° C. and its liquidus temperature up to 1470° C. and therefore it is difficult to realize large-scale industrial production. Eventually OC stopped production of S-2 glass fiber and transferred its patent to American company AGY which has been producing S glass fiber and its improved products in a small scale.

Thereafter, in order to decrease the melting temperature and forming temperature of glass to better satisfy the needs of large-scale production with refractory-lined furnaces, large foreign companies successively developed high-performance glasses based on an $MgO$—$CaO$—$Al_2O_3$—$SiO_2$ system. Typical solutions were R glass of French company Saint-Gobain and HiPer-tex glass of American company OC, which were a trade-off for production scale by sacrificing some of the glass properties. However, as these designed solutions were too conservative, especially the content of $Al_2O_3$ was kept more than 20%, preferably 25%, the production of glass remained highly difficult. Although small-scale production with refractory-lined furnaces was achieved, the production efficiency was low and the cost performance ratio of the products was not high. Therefore, OC also stopped production of HiPer-tex glass fiber and transferred its patent to the European company 3B. Around 2007, OC acquired the fiberglass business of Stain-Gobain and formed the company OCV. Accordingly the core technology of R glass fiber was transferred to OCV. The traditional R glass is difficult to fiberize as its forming temperature is up to about 1410° C. and its liquidus temperature up to 1330° C., which causes difficulty in attenuating glass fiber and consequently in realizing large-scale industrial production.

In addition, there is an improved type of R glass fiber, and its strength and modulus are much higher than those of the traditional E glass fiber and its melting and forming conditions are better than those of the traditional R glass fiber. However, this type of R glass has a high risk of devitrification. Meanwhile, since too much $Li_2O$ is introduced, not only the chemical stability of the glass is decreased, but also its raw material cost gets significantly higher. Therefore it is also not suitable for large-scale industrial production.

The high-strength #2 glass fiber mainly comprises $SiO_2$, $Al_2O_3$ and $MgO$, and certain amounts of $Li_2O$, $B_2O_3$, $CeO_2$ and $Fe_2O_3$ are also introduced. It also has high strength and high modulus and its forming temperature is only about 1245° C. and its liquidus temperature is 1320° C. Both temperatures are much lower than those of S glass fiber. However, since its forming temperature is lower than its liquidus temperature, which is unfavorable for the control of glass fiber attenuation, the forming temperature has to be increased and specially-shaped tips have to be used to prevent a glass crystallization phenomenon from occurring in the fiber attenuation process. This causes difficulty in temperature control and also makes it difficult to realize large-scale industrial production.

Owing to the restriction in production conditions, i.e., the unsuitability for large-scale industrial production, the high-performance glass fibers available at present is very expensive both for their high production costs and selling prices, which lead to a very small output of these fibers. They are utilized only in a limited application fields such as aerospace and military, and cannot satisfy the large demands from the new fields such as high-power wind blades, high-pressure pipelines and pressure vessels.

DETAILED DESCRIPTION OF THE INVENTION

The present invention aims to solve the issue described above. The purpose of the present invention is to provide a high-performance glass fiber composition which can not only significantly increase mechanical properties of the glass over those of the traditional R glass, but also greatly reduce the glass viscosity and crystallization risks by achieving a lower liquidus temperature and forming temperature and a reduced amount of bubbles as compared with the traditional R glass, thereby making it more suitable for large-scale production with refractory-lined furnaces.

According to one aspect of the present invention, a glass fiber composition is provided comprising the following components expressed as percentage by weight:

| | |
|---|---|
| $SiO_2$ | 58.5-62.5% |
| $Al_2O_3$ | 14.5-17% |
| CaO | 10.5-14.5% |
| MgO | 8-10% |
| $Li_2O$ | >0.5%, and ≤1% |

|         |           |
|---------|-----------|
| Na₂O    | 0.05-1%   |
| K₂O     | 0.05-1%   |
| Fe₂O₃   | 0.05-1%   |
| TiO₂    | 0.15-1.5% | wherein, the range of the molar percentage ratio $C1=Li_2O/Al_2O_3$ is 0.105-0.22, and the range of the molar percentage ratio $C2=MgO/(CaO+MgO)$ is 0.435-0.55;

Wherein, the said glass fiber composition comprises SrO at a content of 0-2% expressed as percentage by weight;

Wherein, the range of the molar percentage ratio $C1=MgO/(CaO+MgO)$ is 0.44-0.53;

Wherein, the content of SrO expressed as percentage by weight is 0.2-1.5%;

Wherein, the range of the weight percentage ratio $C3=(MgO+SrO)/CaO$ is 0.58-0.9;

Wherein, the composition comprises the following components expressed as percentage by weight:

|         |                |
|---------|----------------|
| SiO₂    | 59-62%         |
| Al₂O₃   | 15-16.5%       |
| CaO     | 11.8-14.5%     |
| MgO     | 8-10%          |
| Li₂O    | >0.6%, and ≤1% |
| Na₂O    | 0.05-1%        |
| K₂O     | 0.05-1%        |
| Fe₂O₃   | 0.05-1%        |
| TiO₂    | 0.15-1.5%      |
| SrO     | 0-2%           | wherein, the range of the molar percentage ratio $C1=Li_2O/Al_2O_3$ is 0.125-0.21, and the range of the molar percentage ratio $C2=MgO/(CaO+MgO)$ is 0.44-0.53;

Wherein, the composition comprises the following components expressed as percentage by weight:

|         |                 |
|---------|-----------------|
| SiO₂    | 59-62%          |
| Al₂O₃   | 15-16.5%        |
| CaO     | 11.8-14.5%      |
| MgO     | 8-10%           |
| Li₂O    | >0.75%, and ≤1% |
| Na₂O    | 0.05-1%         |
| K₂O     | 0.05-1%         |
| Fe₂O₃   | 0.05-1%         |
| TiO₂    | 0.2-1.5%        |
| SrO     | 0-2%            | wherein, the range of the molar percentage ratio $C1=Li_2O/Al_2O_3$ is 0.155-0.21, and the range of the molar percentage ratio $C2=MgO/(CaO+MgO)$ is 0.44-0.53;

Wherein, the composition comprises the following components expressed as percentage by weight:

|         |                |
|---------|----------------|
| SiO₂    | 59-62%         |
| Al₂O₃   | 15-16.5%       |
| CaO     | 11.8-14.5%     |
| MgO     | 8-10%          |
| Li₂O    | >0.5%, and ≤1% |
| Na₂O    | 0.05-1%        |
| K₂O     | 0.05-1%        |
| Fe₂O₃   | 0.05-1%        |
| TiO₂    | 0.15-1.5%      |
| SrO     | 0.2-1.5%       | wherein, the range of the molar percentage ratio $C1=Li_2O/Al_2O_3$ is 0.105-0.22, and the molar percentage ratio $C2=MgO/(CaO+MgO)$ is 0.435-0.55, and the range of the weight percentage ratio $C3=(MgO+SrO)/CaO$ is 0.58-0.9.

According to another aspect of this invention, a glass fiber produced with said glass fiber composition is provided.

According to yet another aspect of this invention, a composite material incorporating said glass fiber is provided.

By introducing a relatively high content of $Li_2O$, reasonably configuring the weight percentage ratio of CaO to MgO and the molar percentage ratios of $MgO/(CaO+MgO)$ and $Li_2O/Al_2O_3$, and utilizing the synergistic effects of $Li_2O$ and $Al_2O_3$, $Li_2O$ and MgO, as well as CaO and MgO, the glass fiber composition of the present invention can not only significantly increase mechanical properties of the glass over those of the traditional R glass, but also greatly reduce the glass viscosity and crystallization risks by achieving a lower liquidus temperature and forming temperature and a reduced amount of bubbles as compared with the traditional R glass, thereby making it more suitable for large-scale production with refractory-lined furnaces. In addition, the aforementioned favorable technical effects are further strengthened by the glass fiber composition of the present invention with a selective introduction of SrO at an appropriate amount and a utilization of the CaO, MgO and SrO ternary mixed alkali earth effect.

Specifically, the glass fiber composition according to the present invention comprises the following components expressed as percentage by weight:

|         |                |
|---------|----------------|
| SiO₂    | 58.5-62.5%     |
| Al₂O₃   | 14.5-17%       |
| CaO     | 10.5-14.5%     |
| MgO     | 8-10%          |
| Li₂O    | >0.5%, and ≤1% |
| Na₂O    | 0.05-1%        |
| K₂O     | 0.05-1%        |
| Fe₂O₃   | 0.05-1%        |
| TiO₂    | 0.15-1.5%      | wherein, the range of the molar percentage ratio $C1=Li_2O/Al_2O_3$ is 0.105-0.22, and the range of the molar percentage ratio $C2=MgO/(CaO+MgO)$ is 0.435-0.55.

The effect and content of each component in said glass fiber composition is described as follows:

$SiO_2$ is a main oxide forming the glass network and has the effect of stabilizing all the components. In the glass fiber composition of the present invention, the restricted content range of $SiO_2$ is 58.5-62.5%. Too low of a content will affect the mechanical properties of the glass; too high of a content will cause the glass viscosity to be excessively high thereby resulting in melting and fining issues. Preferably, the $SiO_2$ content range can be 59-62%.

$Al_2O_3$ is an intermediate oxide of the glass network and a conditional glass former. It is present in two coordination states, i.e., four-coordinated state (tetrahedral) and six-coordinate state (octahedron). In a high-performance glass system, there is typically a high content of $Al_2O_3$, and the proportion of the octahedron $[AlO_6]$ will increase as the content of $Al_2O_3$ grows, thereby causing an increasing risk of crystallization or phase separation of the glass. The inventors find from a great amount of experiments and researches that, in a high-performance glass system, when there are sufficient free oxygen and many metal ions with high ionic field strength, $Al_2O_3$ can have a better fluxing effect at high temperature melting stage and, at lower temperature fiber forming stage, more $Al_2O_3$ can enter the glass network in the form of the tetrahedral [$AlO_4$]; at the same time, due to the buildup effect of high field strength metal ions, $Al_2O_3$ can reinforce the network structure more effectively, thus reducing the crystallization risks while increasing the mechanical properties of the glass. The above conditions can exactly be provided by a relatively high content of $Li_2O$. According to the inventors' findings, $Li_2O$ can not only provide a considerable amount of free oxygen, but also have a high ionic field strength that is conducive to the formation of the tetrahedral with more aluminum ions, thereby strengthening the network structure of the glass. Therefore, it is highly important to determine the appropriate amounts of $Al_2O_3$ and $Li_2O$ and the ratio there between.

Therefore, in the glass composition according to the present invention, the restricted content range of $Al_2O_3$ is 14.5-17%, and the restricted content range of $Li_2O$ is more than 0.5% but not more than 1%, and the range of the molar percentage ratio $C1=Li_2O/Al_2O_3$ is 0.105-0.22. Preferrably, the content range of $Al_2O_3$ is 15-16.5%, and the content range of $Li_2O$ is more than 0.6% but not more than 1%, and the range of the molar percentage ratio $C1=Li_2O/Al_2O_3$ is 0.125-0.21. More preferably, the content range of $Li_2O$ is more than 0.75% but not more than 1%, and the range of the molar percentage ratio $C1=Li_2O/Al_2O_3$ is 0.155-0.21.

CaO is a modifying oxide of the glass network that is present only in the six-coordinate state. It has the effect of regulating the glass viscosity and controlling the glass crystallization, and can also improve the strength of glass, produce a moderate rate of hardening of molten glass, and accelerate the fiberizing rate of the glass. MgO is also a modifying oxide of the glass network present in both the four-coordinated state (tetrahedral) and mostly the six-coordinate state (octahedron). It also has the effect of regulating the glass viscosity and controlling the glass crystallization, helps to increase the modulus of the glass and, when CaO is partly replaced with MgO, can produce a moderate rate of hardening of molten glass.

For a high-performance glass based on an MgO—CaO—$Al_2O_3$—$SiO_2$ system, the crystal phases it contains after the glass crystallization mainly include diopside ($CaMgSi_2O_6$) and anorthite ($CaAl_2Si_2O_8$). The molar ratio of $Ca^{2+}/Mg^{2+}$ in the molecular formula of diopside is 1. Sufficient amounts of both $Ca^{2+}$ and $Mg^{2+}$ are needed for diopside crystals to grow completely and rapidly. Similarly, anorthite crystals need a $Ca^{2+}$ rich environment to be able to grow rapidly. In the present invention, the weight percentage ratio $C2=MgO/(CaO+MgO)$ is introduced to measure and control the $Ca^{2+}/Mg^{2+}$ molar ratio in order to inhibit the growth of these two crystal phases simultaneously. The inventors have found that, in a traditional high-performance glass system, the amount of the $Ca^{2+}$ ions is often relatively high, hence a relatively low molar ratio of MgO/(CaO+MgO) that is often lower than 0.43 and even lower than 0.41. In such case, since the amount of $Ca^{2+}$ ions is sufficient for complete and rapid growth of the crystal phases, the growth of the two crystal phases cannot be inhibited simultaneously, even though there is a change in the ratio of the two crystal phases in the final crystallization products.

With further research, the inventors have unexpectedly found that, in the glass fiber composition of the present invention, when the range of the molar ratio of $C2=MgO/(CaO+MgO)$ is controlled to be 0.435-0.55, the glass liquidus temperature and the degree of crystallization are significantly decreased. The significant decrease of the degree of crystallization of crystal phases is manifested by a noticeable decrease in the intensity of X-ray diffraction peaks. At the same time, the SEM pictures show that the crystal grains of diopside change from a columnar or rod-like shape to a long and thin needle-like shape and the crystal grains become smaller and their completeness declines. The inventors believe that this is mainly because that, with the increase of the molar ratio of MgO/(CaO+MgO) and an increasing amount of $Mg^{2+}$ ions, there will be a shortage of $Ca^{2+}$ ions for complete and rapid crystallization, and the crystallization processes of both diopside and anorthite will then be significantly affected, thereby achieving the effect of simultaneously inhibiting the crystallization tendency of the two crystal phases. At the same time, with the increase of the molar ratio of MgO/(CaO+MgO), since the molecular weight of MgO is lower than that of CaO, when MgO is used to replace CaO of the same mass, the oxygen provided by MgO is much more than that by CaO, which helps more aluminum ions to form tetrahedral coordination, thereby strengthening the network of the glass system and further reducing the crystallization tendency. However, the MgO/(CaO+MgO) molar ratio should not be too high, otherwise there will be a large surplus of magnesium ions, which will increase to a certain extent the crystallization tendency of a new crystal phase—forsterite ($Mg_2SiO_6$).

Therefore, in the glass fiber composition of the present invention, the restricted content range of CaO is 10.5-14.5%, and the restricted content range of MgO is 8-10%, and the range of the molar ratio $C2=MgO/(CaO+MgO)$ is 0.435-0.55. Preferably, the content range of CaO is 11.8-14.5%, and the molar ratio $C2=MgO/(CaO+MgO)$ is 0.44-0.53.

Both $K_2O$ and $Na_2O$ can reduce glass viscosity and are good fluxing agents. Replacing $Na_2O$ with $K_2O$ while keeping the total amount of alkali metal oxides unchanged can reduce the crystallization tendency of glass, improve the fiberizing performance, and also reduce the surface tension of molten glass and improve the glass melting performance. Therefore, in the glass composition of the present invention, the restricted content ranges of $Na_2O$ and of $K_2O$ are 0.05-1% respectively, so as to achieve a good result.

The introduction of $Fe_2O_3$ facilitates the melting of glass and can also improve the crystallization performance of glass. However, since ferric ions and ferrous ions have a coloring effect, the introduced amount should be limited. Therefore, in the glass fiber composition of the present invention, the restricted content range of $Fe_2O_3$ is 0.05-1%.

$TiO_2$ can not only reduce the glass viscosity at high temperature, but also has a certain fluxing effect. Therefore, in the glass fiber composition of the present invention, the restricted content range of $TiO_2$ is 0.15-1.5%.

In addition, an appropriate amount of SrO is introduced into the glass fiber composition of this invention to further strengthen the aforementioned beneficial technical effects with the CaO, MgO and SrO ternary mixed alkali earth effect. The inventors have concluded from a great amount of researches that, when their ratios are rational, the technical effect of the CaO, MgO and SrO ternary mixed alkali earth effect is noticeably better than that of the CaO and MgO binary mixed alkali earth effect. This is because, as more alkali earth metal ions with different radiuses participate in the replacement process, a compact stacking structure forms more easily and thereby the glass has better crystallization and mechanical properties. At the same time, considering the matching between ions of different sizes, it is appropriate to control the ratio of the sum of SrO and MgO to CaO. Since the ionic radiuses of $Mg^{2+}$, $Ca^{2+}$ and $Sr^{2+}$ sequentially become bigger and their ion field strengths sequentially become lower, in order to achieve a compact stacking structure, the matching between the numbers of three types of ions becomes very important. What is particularly noteworthy is that, an appropriate amount of SrO is introduced in the glass fiber composition of the present invention, and, by way of a rationally adjusted ratio of (MgO+SrO)/CaO, the tendency and degree of the glass crystallization can be effectively controlled.

In principle, crystallization is a process of formation and continuous growth of crystal nucleuses, i.e., a process of movement and restructuring of various atoms in glass. The ternary alkali earth system designed in the present invention makes it easier to achieve a compact stacking structure of the glass. At the same time, since the ionic radius of $Sr^{2+}$ is bigger, not only it is difficult for $Sr^{2+}$ ions themselves to move, but also they can effectively impede the movement and restructuring of $Mg^{2+}$ and $Ca^{2+}$ ions under the same conditions, thereby achieving the objective of inhibiting the crystallization tendency and reducing the crystallization rate. Therefore, from the glass fiber composition of the present invention an even better crystallization performance can be obtained.

The present invention comprehensively considers the CaO, MgO and SrO ternary mixed alkali earth effect and selects an appropriate SrO content to be able to achieve a lower liquidus temperature, lower degree of crystallization and higher mechanical properties. However, as the molecular weight of strontium oxide is relatively high, an excessive addition of strontium oxide will lead to an increase of the glass density, which will have a negative impact on the specific strength and specific modulus of glass fiber. Therefore, in the present invention, the restricted SrO content range is 0-2%. Preferably, the SrO content range is 0.2-1.5%, and the range of the weight percentage ratio C3=(MgO+SrO)/CaO is 0.58-0.9.

In addition, the glass fiber composition of the present invention allows the existence of a small amount of fluorine ($F_2$). However, considering the great negative impact of fluorine on environment, normally it is not intentionally added.

In the glass fiber composition of the present invention, the beneficial effects produced by the aforementioned selected ranges of the components will be explained through the specific experimental data given in the examples provided below.

The following are examples of preferred content ranges of the components contained in the glass fiber composition according to the present invention.

Preferred Example 1

The glass fiber composition according to the present invention comprises the following components expressed as percentage by weight:

| | |
|---|---|
| $SiO_2$ | 59-62% |
| $Al_2O_3$ | 15-16.5% |
| CaO | 11.8-14.5% |
| MgO | 8-10% |
| $Li_2O$ | >0.6%, and ≤1% |
| $Na_2O$ | 0.05-1% |
| $K_2O$ | 0.05-1% |
| $Fe_2O_3$ | 0.05-1% |
| $TiO_2$ | 0.15-1.5% |
| SrO | 0-2% | wherein, the range of the molar percentage ratio C1=$Li_2O/Al_2O_3$ is 0.125-0.21, and the range of the molar percentage ratio C2=MgO/(CaO+MgO) is 0.44-0.53.

Preferred Example 2

The glass fiber composition according to the present invention comprises the following components expressed as percentage by weight:

| | |
|---|---|
| $SiO_2$ | 59-62% |
| $Al_2O_3$ | 15-16.5% |
| CaO | 11.8-14.5% |
| MgO | 8-10% |
| $Li_2O$ | >0.75%, and ≤1% |
| $Na_2O$ | 0.05-1% |
| $K_2O$ | 0.05-1% |
| $Fe_2O_3$ | 0.05-1% |
| $TiO_2$ | 0.2-1.5% |
| SrO | 0-2% | wherein, the range of the molar percentage ratio C1=$Li_2O/Al_2O_3$ is 0.155-0.21, and the range of the molar percentage ratio C2=MgO/(CaO+MgO) is 0.44-0.53.

Preferred Example 3

The glass fiber composition according to the present invention comprises the following components expressed as percentage by weight:

| | |
|---|---|
| $SiO_2$ | 59-62% |
| $Al_2O_3$ | 15-16.5% |
| CaO | 11.8-14.5% |
| MgO | 8-10% |
| $Li_2O$ | >0.5%, and ≤1% |
| $Na_2O$ | 0.05-1% |
| $K_2O$ | 0.05-1% |
| $Fe_2O_3$ | 0.05-1% |
| $TiO_2$ | 0.15-1.5% |
| SrO | 0.2-1.5% | wherein, the range of the molar percentage ratio C1=$Li_2O/Al_2O_3$ is 0.105-0.22, and the range of the molar percentage ratio C2=MgO/(CaO+MgO) is 0.435-0.55, and the range of the weight percentage ratio C3=(MgO+SrO)/CaO is 0.58-0.9.

Embodiments of the Invention

In order to better clarify the purposes, technical solutions and advantages of the examples of the present invention, the technical solutions in the examples of the present invention are clearly and completely described below. Obviously, the examples described herein are just part of the examples of the present invention and are not all the examples. All other exemplary embodiments obtained by one skilled in the art on the basis of the examples in the present invention without performing creative work shall all fall into the scope of protection of the present invention. What needs to be made clear is that, as long as there is no conflict, the examples and the features of examples in the present application can be arbitrarily combined with each other.

The basic concept of the present invention is that the components of the glass fiber composition expressed as percentage by weight are: 58.5-62.5% $SiO_2$, 14.5-17% $Al_2O_3$, 10.5-14.5% CaO, 8-10% MgO, 0.5%<$Li_2O$≤1%, 0.05-1% $Na_2O$, 0.05-1% $K_2O$, 0.05-1% $Fe_2O_3$, 0.15-1.5% $TiO_2$ and 0-2% SrO; wherein, the range of the molar percentage ratio C1=$Li_2O/Al_2O_3$ is 0.105-0.22, and the range of the molar percentage ratio C2=MgO/(CaO+MgO) is 0.435-0.55. The glass fiber composition according to the preceding ranges of the present invention can not only significantly increase mechanical properties of the glass over those of the traditional R glass, but also greatly reduce the glass viscosity and crystallization risks by achieving a lower liquidus temperature and forming temperature and a reduced amount of bubbles as compared with the traditional R glass, thereby making it more suitable for large-scale production with refractory-lined furnaces.

The specific content values of $SiO_2$, $Al_2O_3$, CaO, MgO, $Li_2O$, $Na_2O$, $K_2O$, $Fe_2O_3$, $TiO_2$ and SrO in the glass fiber composition of the present invention are selected to be used in the examples, which are compared with the properties of traditional E and R glasses in terms of the following six property parameters, (1) Forming temperature, the temperature at which the glass melt has a viscosity of $10^3$ poise.

(2) Liquidus temperature, the temperature at which the crystal nucleuses begin to form when the glass melt cools off, i.e., the upper limit temperature for glass crystallization.

(3) ΔT value, which is the difference between the forming temperature and the liquidus temperature and indicates the temperature range at which fiber drawing can be performed.

(4) Tensile strength, the maximum tensile stress that the glass fiber can withstand without breakage, which is to be measured as per ASTM2343.

(5) Young's modulus, the longitudinal elastic modulus defining the ability of glass to resist elastic deformation, which is to be measured as per ASTM2343.

(6) Amount of bubbles, to be determined approximately in a procedure set out as follows: Use specific moulds to compress the batch materials in each example into samples of same dimension, which will then be placed on the sample platform of a high temperature microscope. Heat the glass samples according to standard procedures up to the pre-set spatial temperature 1500° C. and then directly cool them off with the cooling hearth of the microscope to the ambient temperature without heat preservation. Finally, examine each of the glass samples under a polarizing microscope to determine the amount of bubbles in each sample. A bubble is identified according to a specific amplification of the microscope.

The aforementioned six parameters and the methods of measuring them are well-known to one skilled in the art. Therefore, the aforementioned parameters can be effectively used to explain the properties of the glass fiber composition of the present invention.

The specific procedures for the experiments are as follows: Each component can be acquired from the appropriate raw materials; the raw materials are mixed in the appropriate proportions so that each component reaches the final expected weight percentage; the mixed batch is melted and clarified; then the molten glass is drawn out through the tips of the bushings, thereby forming the glass fiber; the glass fiber is attenuated onto the rotary collet of a winder to form cakes or packages. Of course, conventional methods can be used to deeply process these glass fibers to meet the expected requirements.

Comparisons of the property parameters of the aforementioned examples and other examples of the glass fiber composition of the present invention with those of the traditional E glass, traditional R glass and improved R glass are further made below by way of the table, wherein the component contents of the glass fiber composition are expressed as weight percentage. What needs to be made clear is that the total amount of the components in the examples is slightly less than 100%, and it should be understood that the remaining amount is trace impurities or a small amount of components which cannot be analyzed.

TABLE 1

| | | A1 | A2 | A3 | A4 | A5 | A6 | A7 | Traditional E glass | Traditional R glass | Improved R glass |
|---|---|---|---|---|---|---|---|---|---|---|---|
| Component | $SiO_2$ | 61.2 | 60.6 | 61.0 | 60.2 | 61.6 | 61.0 | 60.5 | 54.16 | 60 | 58 |
| | $Al_2O_3$ | 15.7 | 15.7 | 15.8 | 16.1 | 15.7 | 15.4 | 15.4 | 14.32 | 25 | 17.9 |
| | CaO | 12.0 | 11.8 | 12.0 | 13.4 | 12.2 | 13.2 | 13.8 | 22.12 | 9 | 14.4 |
| | MgO | 8.7 | 9.1 | 8.7 | 8.3 | 8.5 | 8.4 | 8.3 | 0.41 | 6 | 8.5 |
| | SrO | 0.5 | 1.0 | 1.5 | 0 | 0 | 0 | 0 | 0 | 0 | 0 |
| | $B_2O_3$ | 0 | 0 | 0 | 0 | 0 | 0 | 0 | 7.6 | 0 | 0 |
| | $Na_2O$ | 0.21 | 0.21 | 0.21 | 0.26 | 0.21 | 0.21 | 0.21 | 0.45 | trace amount | 0.1 |
| | $K_2O$ | 0.13 | 0.13 | 0.13 | 0.08 | 0.13 | 0.13 | 0.13 | 0.25 | trace amount | 0.6 |
| | $Li_2O$ | 0.61 | 0.51 | 0.71 | 0.84 | 0.91 | 0.81 | 0.76 | 0 | 0 | 0 |
| | $Fe_2O_3$ | 0.36 | 0.36 | 0.36 | 0.36 | 0.36 | 0.36 | 0.36 | 0.35 | trace amount | trace amount |
| | $TiO_2$ | 0.42 | 0.42 | 0.42 | 0.34 | 0.37 | 0.37 | 0.42 | 0.34 | trace amount | 0.2 |
| Ratio | C1 | 0.132 | 0.110 | 0.153 | 0.177 | 0.197 | 0.179 | 0.168 | 0 | 0 | 0 |
| | C2 | 0.504 | 0.519 | 0.504 | 0.464 | 0.494 | 0.471 | 0.457 | 0.025 | 0.483 | 0.453 |
| | C3 | 0.76 | 0.85 | 0.85 | 0.62 | 0.70 | 0.63 | 0.60 | 0.02 | 0.67 | 0.59 |
| Parameter | Forming temperature/° C. | 1280 | 1282 | 1278 | 1277 | 1276 | 1279 | 1278 | 1175 | 1430 | 1289 |
| | Liquidus temperature/° C. | 1198 | 1200 | 1197 | 1196 | 1196 | 1198 | 1200 | 1075 | 1350 | 1280 |
| | ΔT/° C. | 82 | 82 | 81 | 81 | 80 | 81 | 78 | 100 | 80 | 9 |
| | Tensile strength/MPa | 2610 | 2560 | 2670 | 2620 | 2650 | 2630 | 2580 | 1790 | 2490 | 2410 |
| | Young's modulus/GPa | 89.1 | 89.0 | 89.3 | 89.7 | 89.6 | 89.5 | 89.3 | 74.0 | 88.7 | 87.5 |
| | Amount | 10 | 12 | 9 | 6 | 4 | 6 | 9 | 3 | 30 | 25 |

It can be seen from the values in the above table that, compared with the traditional R glass and the improved R glass, the glass fiber composition of the present invention has the following advantages: (1) much lower liquidus temperature, which helps to reduce crystallization risk and increase the fiber drawing efficiency; (2) significantly improved mechanical properties; (3) much lower amount of bubbles, which indicates a significant quality improvement of the glass melt according to the present invention. Specifically, compared with R glass, the glass fiber composition of the present invention has made a breakthrough in terms of crystallization risk control and mechanical properties improvement with significantly reduced amount of bubbles under the same conditions. Therefore, compared with traditional R glass and improved R glass, the overall technical solution of the present invention enables an easier achievement of large-scale industrial production.

By introducing a relatively high content of $Li_2O$, reasonably configuring the weight percentage ratio of CaO to MgO, and the molar percentage ratios of MgO/(CaO+MgO) and $Li_2O/Al_2O_3$, and utilizing the synergistic effects of $Li_2O$ and $Al_2O_3$, $Li_2O$ and MgO, as well as CaO and MgO, the glass fiber composition of the present invention can not only significantly increase mechanical properties of the glass over those of the traditional R glass, but also greatly reduce the glass viscosity and crystallization risks by achieving a lower liquidus temperature and forming temperature and a reduced amount of bubbles as compared with the traditional R glass, thereby making it more suitable for large-scale production with refractory-lined furnaces.

The glass fiber composition according to the present invention can be used for making glass fibers having the aforementioned excellent properties.

The glass fiber composition according to the present invention can be used in combination with one or more organic and/or inorganic materials for preparing composite materials having excellent performances, such as glass fiber reinforced base materials.

Finally, what should be made clear is that, in this text, the terms "contain", "comprise" or any other variants are intended to mean "non-exclusively include" so that any process, method, article or equipment that contains a series of factors shall include not only such factors, but also include other factors that are not explicitly listed, or also include intrinsic factors of such process, method, object or equipment. Without more limitations, factors defined by the phrase "contain a . . . " do not rule out that there are other same factors in the process, method, article or equipment which include said factors.

The above examples are provided only for the purpose of illustrating instead of limiting the technical solutions of the present invention. Although the present invention is described in details by way of aforementioned examples, one skilled in the art shall understand that modifications can also be made to the technical solutions embodied by all the aforementioned examples or equivalent replacement can be made to some of the technical features. However, such modifications or replacements will not cause the resulting technical solutions to substantially deviate from the spirits and ranges of the technical solutions respectively embodied by all the examples of the present invention.

INDUSTRIAL APPLICABILITY OF THE INVENTION

The glass fiber composition according to the present invention can not only significantly increase mechanical properties of the glass over those of the traditional R glass, but also greatly reduce the glass viscosity and crystallization risks by achieving a lower liquidus temperature and forming temperature and a reduced amount of bubbles as compared with the traditional R glass, thereby making it more suitable for large-scale production with refractory-lined furnaces. Compared with the current mainstream high-performance glasses, the glass fiber composition of the present invention has made a breakthrough in terms of tensile strength, crystallization performance and Young's modulus with significantly improved mechanical properties and reduced amount of bubbles under the same conditions. Therefore, the overall technical solution of the present invention enables an easier achievement of large-scale industrial production of high-performance glass fiber.

The invention claimed is:

1. A glass fiber composition; comprising the following components expressed as percentage by weight:

| | |
|---|---|
| $SiO_2$ | 58.5-62.5% |
| $Al_2O_3$ | 14.5-17% |
| CaO | 10.5-13.2% |
| MgO | 8-10% |
| $Li_2O$ | >0.6%, and ≤1% |
| $Na_2O$ | 0.05-1% |
| $K_2O$ | 0.05-1% |
| $Fe_2O_3$ | 0.05-1% |
| $TiO_2$ | 0.15-1.5% | wherein, the range of the molar percentage ratio $C1=Li_2O/Al_2O_3$ is 0.125-0.177, and the range of the molar percentage ratio C2=MgO/(CaO+MgO) is 0.471-0.55.

2. The glass fiber composition according to claim 1, comprising SrO at a content of 0-2% expressed as percentage by weight.

3. The glass fiber composition according to claim 2, comprising SrO at a content of 0.2-1.5% expressed as percentage by weight.

4. The glass fiber composition according to claim 3, wherein the range of the weight percentage ratio C3=(MgO+SrO)/CaO is 0.58-0.9.

5. The glass fiber composition according to claim 1, wherein the range of the molar percentage ratio C2=MgO/(CaO+MgO) is 0.471-0.53.

6. The glass fiber composition according to claim 1, wherein the range of the weight percentage ratio C3=(MgO+SrO)/CaO is 0.58-0.9.

7. The glass fiber composition according to claim 1, comprising the following components expressed as percentage by weight:

| | |
|---|---|
| $SiO_2$ | 59-62% |
| $Al_2O_3$ | 15-16.5% |
| CaO | 11.8-13.2% |
| MgO | 8-10% |
| $Li_2O$ | >0.6%, and ≤1% |
| $Na_2O$ | 0.05-1% |
| $K_2O$ | 0.05-1% |
| $Fe_2O_3$ | 0.05-1% |
| $TiO_2$ | 0.15-1.5% |
| SrO | 0-2% | wherein, the range of the molar percentage ratio $C1=Li_2O/Al_2O_3$ is 0.125-0.177, and the range of the molar percentage ratio $C2=MgO/(CaO+MgO)$ is 0.471-0.53.

8. The glass fiber composition according to claim 1, comprising the following components expressed as percentage by weight:

| | |
|---|---|
| $SiO_2$ | 59-62% |
| $Al_2O_3$ | 15-16.5% |
| CaO | 11.8-13.2% |
| MgO | 8-10% |
| $Li_2O$ | >0.75%, and ≤1% |
| $Na_2O$ | 0.05-1% |
| $K_2O$ | 0.05-1% |
| $Fe_2O_3$ | 0.05-1% |
| $TiO_2$ | 0.2-1.5% |
| SrO | 0-2% | wherein, the range of the molar percentage ratio $C1=Li_2O/Al_2O_3$ is 0.155-0.177, and the range of the molar percentage ratio $C2=MgO/(CaO+MgO)$ is 0.471-0.53.

9. The glass fiber composition according to claim 1, comprising the following components expressed as percentage by weight:

| | |
|---|---|
| $SiO_2$ | 59-62% |
| $Al_2O_3$ | 15-16.5% |
| CaO | 11.8-13.2% |
| MgO | 8-10% |
| $Li_2O$ | >0.6%, and ≤1% |
| $Na_2O$ | 0.05-1% |
| $K_2O$ | 0.05-1% |
| $Fe_2O_3$ | 0.05-1% |
| $TiO_2$ | 0.15-1.5% |
| SrO | 0.2-1.5% | wherein, the range of the molar percentage ratio $C1=Li_2O/Al_2O_3$ is 0.125-0.177, and the range of the molar percentage ratio $C2=MgO/(CaO+MgO)$ is 0.471-0.55, and the range of the weight percentage ratio $C3=(MgO+SrO)/CaO$ is 0.58-0.9.

10. A glass fiber being produced from the glass fiber composition described in claim 1.

11. The glass fiber according to claim 10, wherein the glass fiber composition comprising SrO at a content of 0-2% expressed as percentage by weight.

12. The glass fiber according to claim 10, wherein the glass fiber composition comprising SrO at a content of 0.2-1.5% expressed as percentage by weight.

13. The glass fiber according to claim 12, wherein the range of the weight percentage ratio $C3=(MgO+SrO)/CaO$ is 0.58-0.9.

14. The glass fiber according to claim 10, wherein the range of the molar percentage ratio $C2=MgO/(CaO+MgO)$ is 0.471-0.53.

15. The glass fiber according to claim 10, wherein the range of the weight percentage ratio $C3=(MgO+SrO)/CaO$ is 0.58-0.9.

16. The glass fiber according to claim 10, wherein the glass fiber composition comprising the following components expressed as percentage by weight:

| | |
|---|---|
| $SiO_2$ | 59-62% |
| $Al_2O_3$ | 15-16.5% |
| CaO | 11.8-13.2% |
| MgO | 8-10% |
| $Li_2O$ | >0.6%, and ≤1% |
| $Na_2O$ | 0.05-1% |
| $K_2O$ | 0.05-1% |
| $Fe_2O_3$ | 0.05-1% |
| $TiO_2$ | 0.15-1.5% |
| SrO | 0-2% | wherein, the range of the molar percentage ratio $C1=Li_2O/Al_2O_3$ is 0.125-0.177, and the range of the molar percentage ratio $C2=MgO/(CaO+MgO)$ is 0.471-0.53.

17. The glass fiber according to claim 10, wherein the glass fiber composition comprising the following components expressed as percentage by weight:

| | |
|---|---|
| $SiO_2$ | 59-62% |
| $Al_2O_3$ | 15-16.5% |
| CaO | 11.8-13.2% |
| MgO | 8-10% |
| $Li_2O$ | >0.75%, and ≤1% |
| $Na_2O$ | 0.05-1% |
| $K_2O$ | 0.05-1% |
| $Fe_2O_3$ | 0.05-1% |
| $TiO_2$ | 0.2-1.5% |
| SrO | 0-2% | wherein, the range of the molar percentage ratio $C1=Li_2O/Al_2O_3$ is 0.155-0.177, and the range of the molar percentage ratio $C2=MgO/(CaO+MgO)$ is 0.471-0.53.

18. The glass fiber according to claim 10, wherein the glass fiber composition comprising the following components expressed as percentage by weight:

| | |
|---|---|
| $SiO_2$ | 59-62% |
| $Al_2O_3$ | 15-16.5% |
| CaO | 11.8-13.2% |
| MgO | 8-10% |
| $Li_2O$ | >0.6%, and ≤1% |
| $Na_2O$ | 0.05-1% |
| $K_2O$ | 0.05-1% |
| $Fe_2O_3$ | 0.05-1% |
| $TiO_2$ | 0.15-1.5% |
| SrO | 0.2-1.5% | wherein, the range of the molar percentage ratio $C1=Li_2O/Al_2O_3$ is 0.125-0.177, and the range of the molar percentage ratio $C2=MgO/(CaO+MgO)$ is 0.471-0.55, and the range of the weight percentage ratio $C3=(MgO+SrO)/CaO$ is 0.58-0.9.

19. A composite material incorporating the glass fiber described in claim 10.

* * * * *